US009426532B2

(12) United States Patent
Kuo

(10) Patent No.: US 9,426,532 B2
(45) Date of Patent: Aug. 23, 2016

(54) IPTV EPG LINKING BROADCAST CHANNELS TO INTERNET SOURCES OF SCHEDULED PROGRAMMING

(75) Inventor: Jenke Wu Kuo, San Diego, CA (US)

(73) Assignee: Sony Corporation, Tokyo (JP)

( * ) Notice: Subject to any disclaimer, the term of this patent is extended or adjusted under 35 U.S.C. 154(b) by 266 days.

(21) Appl. No.: 12/825,878

(22) Filed: Jun. 29, 2010

(65) Prior Publication Data

US 2011/0321094 A1    Dec. 29, 2011

(51) Int. Cl.
| G06F 3/00 | (2006.01) |
| G06F 13/00 | (2006.01) |
| H04N 5/445 | (2011.01) |
| H04N 21/482 | (2011.01) |
| G06F 3/0481 | (2013.01) |
| H04N 21/431 | (2011.01) |
| H04N 21/462 | (2011.01) |
| H04N 21/61 | (2011.01) |

(52) U.S. Cl.
CPC .......... *H04N 21/4821* (2013.01); *G06F 3/0481* (2013.01); *H04N 21/4314* (2013.01); *H04N 21/4622* (2013.01); *H04N 21/6125* (2013.01); *H04N 21/6175* (2013.01)

(58) Field of Classification Search
USPC .................... 725/37, 39–40, 48–51
See application file for complete search history.

(56) References Cited

U.S. PATENT DOCUMENTS

| 5,801,787 | A | * | 9/1998 | Schein et al. ............... 725/43 |
| 6,002,394 | A | | 12/1999 | Schein et al. |
| 6,025,837 | A | | 2/2000 | Matthews et al. |
| 2002/0010932 | A1 | | 1/2002 | Nguyen et al. |
| 2004/0237108 | A1 | * | 11/2004 | Drazin et al. .............. 725/56 |
| 2007/0101370 | A1 | * | 5/2007 | Calderwood .............. 725/47 |
| 2009/0077602 | A1 | * | 3/2009 | O'Neil .................... 725/109 |

FOREIGN PATENT DOCUMENTS

JP       2009171049        7/2009

OTHER PUBLICATIONS

Alcatel Shanghai Bell Co., Ltd.: "Proposal for ITF Requirements to Support IPTV Channel Domain Names" FG IPTV-C-0931, Oct. 15-19, 2007.

* cited by examiner

*Primary Examiner* — Yassin Alata
(74) *Attorney, Agent, or Firm* — John L. Rogitz

(57) ABSTRACT

An EPG presented on an IPTV lists broadcast TV programming but when an entry on the EPG is selected, an Internet server, and not the TV broadcast source, is accessed and streams the listed programming to the IPTV.

19 Claims, 3 Drawing Sheets

ELECTRONIC
PROGRAM
GUIDE

IPTV EPG LINKING BROADCAST CHANNELS TO INTERNET SOURCES OF SCHEDULED PROGRAMMING

FIELD OF THE INVENTION

The present application relates generally to Internet Protocol television (IPTV) electronic program guides (EPG) that display broadcast channels which, when selected, invoke an Internet source for the broadcast content.

BACKGROUND OF THE INVENTION

Internet access through TVs is typically provided by essentially programming the TV as though it were a computer executing a browser. Such Internet access is thus uncontrolled except as a firewall or filtering program might block certain sites.

As understood herein, uncontrolled Internet access may not be desirable in the context of a TV. A firewall or filtering program may not always be installed on the TV and. even when one is installed, access remains much more uncontrolled than conventional TV programming traditionally has expected. Also, a locally installed filter can be unloaded or defeated by a user.

Accordingly, uncontrolled Internet access has several drawbacks. From a viewer's standpoint, exposure to inappropriate subject matter particularly when young viewers are watching is one concern; a much lower threshold of quality screening is another. That is, while many TV shows might not be widely considered as "quality" shows, nonetheless a TV program is usually much more selectively screened than, say, an Internet video. The expectations of TV viewers for such higher level quality screening as a consequence cannot be met by simply providing unfettered Internet access through the TV. Furthermore, TV-related entities, from content providers, manufacturers, and carriers, in most cases derive no benefit from the extension of TV to the Internet.

As also understood herein, through TV broadcast services, TV viewers can download EPGs to the TV (or associated set top boxes) from which the viewer can select a program listed on the EPG, causing the TV to tune the selected channel. As also understood herein, programs on broadcast TV might also be accessible from an Internet-based IPTV server and obtaining such programs from the Internet source instead of the broadcast source can give a viewer added flexibility in terms of accessing past, present, and future programs. Furthermore, under some circumstances the Internet source might deliver higher quality of service than the broadcast source for a program.

SUMMARY OF THE INVENTION

Accordingly, a method includes presenting on a display device a user interface (UI) listing plural broadcast TV programs available from a broadcast TV source. A selection of a TV program on the UI is received at the display device and responsive to receiving the selection of an entry on the UI, an Internet link is obtained to a server sourcing the TV program. The TV program is received from the server for presentation thereof in lieu of receiving the TV program from the broadcast TV source.

The UI may be an electronic program guide (EPG). In such an embodiment, the EPG may include a first column presenting an ordered list of TV broadcast channel numbers and a second column presenting network names and/or station names associated with respective channel numbers in the first column. The EPG may also include a program schedule matrix listing, by sequential time slots, names of broadcast programs from the broadcast TV source.

The display device can include a tuner configured to receive signals from the broadcast TV source. Or, the display device may include no tuner configured to receive signals from the broadcast TV source.

The EPG can include, for at least some broadcast TV programs available from the broadcast TV source, associated hyperlinks pointing to Internet sources of the respective programs. Alternatively, responsive to selection of broadcast TV programs on the EPG, the method includes sending a request for an associated hyperlink to an Internet server.

In another aspect, a consumer electronic (CE) device includes a housing, a display on the housing, a network interface, and a processor in the housing controlling the display and communicating with the Internet through the network interface. The processor executes logic including presenting on the display an electronic program guide (EPG) listing broadcast TV programming. The logic also includes receiving selection of a program entry on the EPG corresponding to a TV program and responsive to selection of the entry, accessing an Internet source of the TV program. The TV program received from the Internet source is presented on the display.

In another aspect, a display device is controlled by a processor to present a visual electronic progam guide (EPG) which includes a first column presenting an ordered list of TV broadcast channel numbers and a second column presenting network names and/or station names associated with respective channel numbers in the first column. Further, the EPG includes a program schedule matrix listing, by sequential time slots, names of broadcast programs from a broadcast TV source. The EPG also shows a source selector element selectable to cause the processor to access a TV program from a TV tuner for presentation on the display and also selectable to cause the processor to access the TV program from an Internet server.

A user may browse an expired EPG to obtain an Internet link to view prior broadcast content through the IPTV connection. A user may engage the IPTV browser through the network connection with broadcast contents of the EPG scene seamlessly. Also, a remote EPG browser may be instantiated on a GUI of a portable device (i.e. tablet, cellular phone, etc.) to control another display device such as a TV through an IP network connection.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
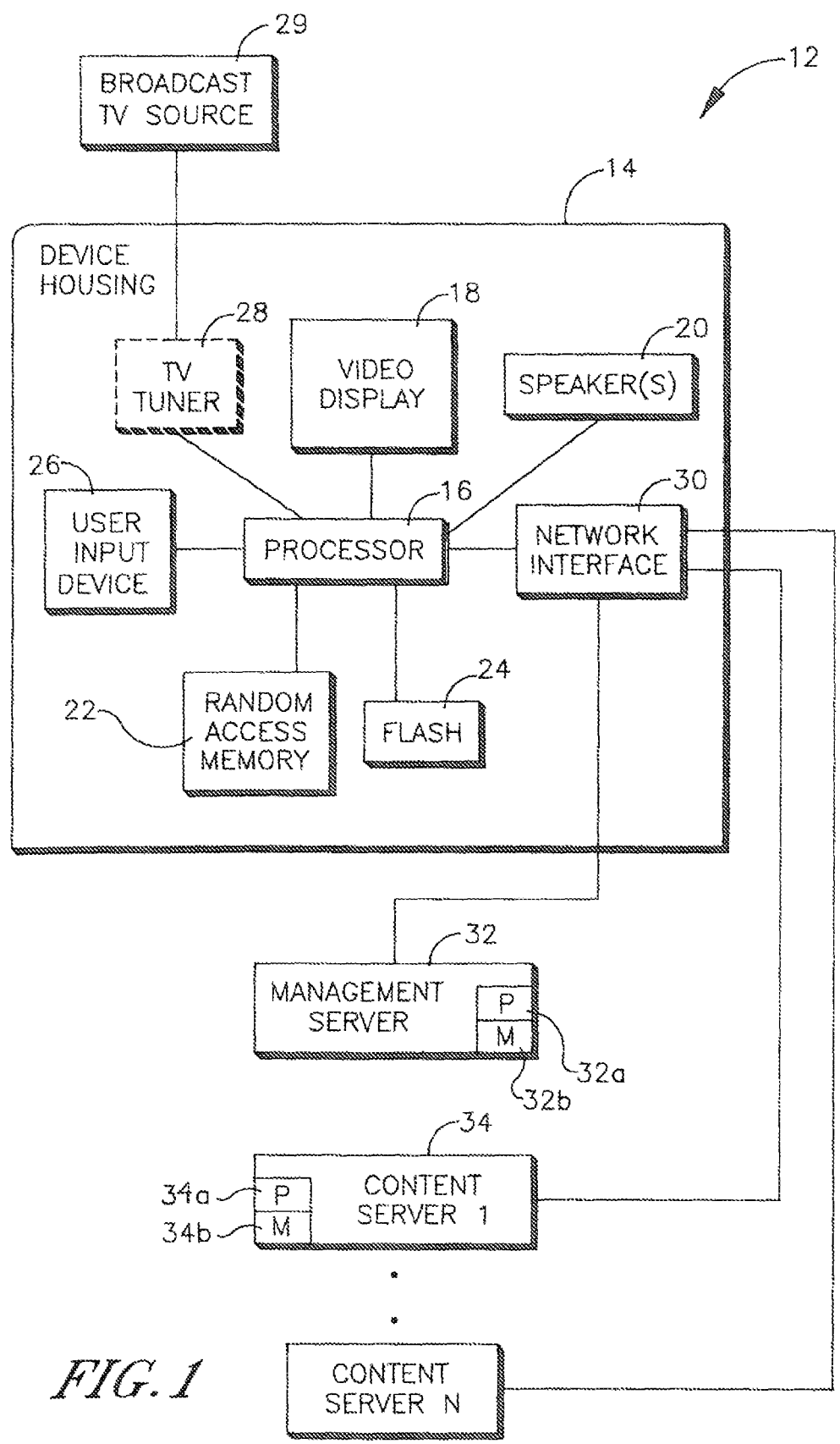
FIG. 1 is a block diagram of an example system in accordance with present principles.

Referring initially to FIG. 1, a consumer electronics (CE) device 12 (also referred to herein as "player" and "IPTV client") such as a TV, game player, video disk player, camera, digital clock radio, mobile telephone, personal digital assistant, laptop computer, etc. includes a portable lightweight plastic housing 14 bearing a digital processor 16. The processor 16 can control a visual display 18 and an audible display 20 such as one or more speakers. The processor 16 may access a media player module such that the CE device 12 has media decoding capability.

To undertake present principles, the processor 16 may access one or more computer readable storage media such as but not limited to RAM-based storage 22 (e.g., a chip implementing dynamic random access memory (DRAM)) or flash memory 24 or disk storage. Software code implementing present logic executable by the CE device 12 may be stored on one of the memories shown to undertake present principles.

The processor 16 can receive user input signals from various input devices 26, including a remote control device, a point and click device such as a mouse, a keypad, etc. A TV tuner 28 may be provided in some implementations particularly when the CE device is embodied by a TV to receive TV signals from a TV broadcast signal source 29 such as a set-top box, satellite receiver, cable head end, terrestrial TV signal antenna, etc. The TV tuner may be implemented in a set top box separately housed from the TV and communicating therewith. In other embodiments, no TV tuner may be provided. Signals from the tuner 28 are sent to the processor 16 for presentation on the display 18 and speakers 20.

As shown in FIG. 1, a network interface 30 such as a wired or wireless modem or wireless telephony transceiver communicates with the processor 16 to provide connectivity to a management server 32 on the Internet and to one or more content servers 34. The servers 32, 34 have respective processors 32a, 34a and respective tangible non-transitory computer readable storage media 32b, 34b such as disk-based and/or solid state storage. It is to be understood in' view of disclosure below that the CE device 12 particularly when implemented by a non-PC device such as a TV or game console or camera can communicate only with the management server 32 and with content servers 34 that appear on a service list provided to the processor 16 by the management server 32, with the service list not being modifiable by the processor 16.

Figure 2:
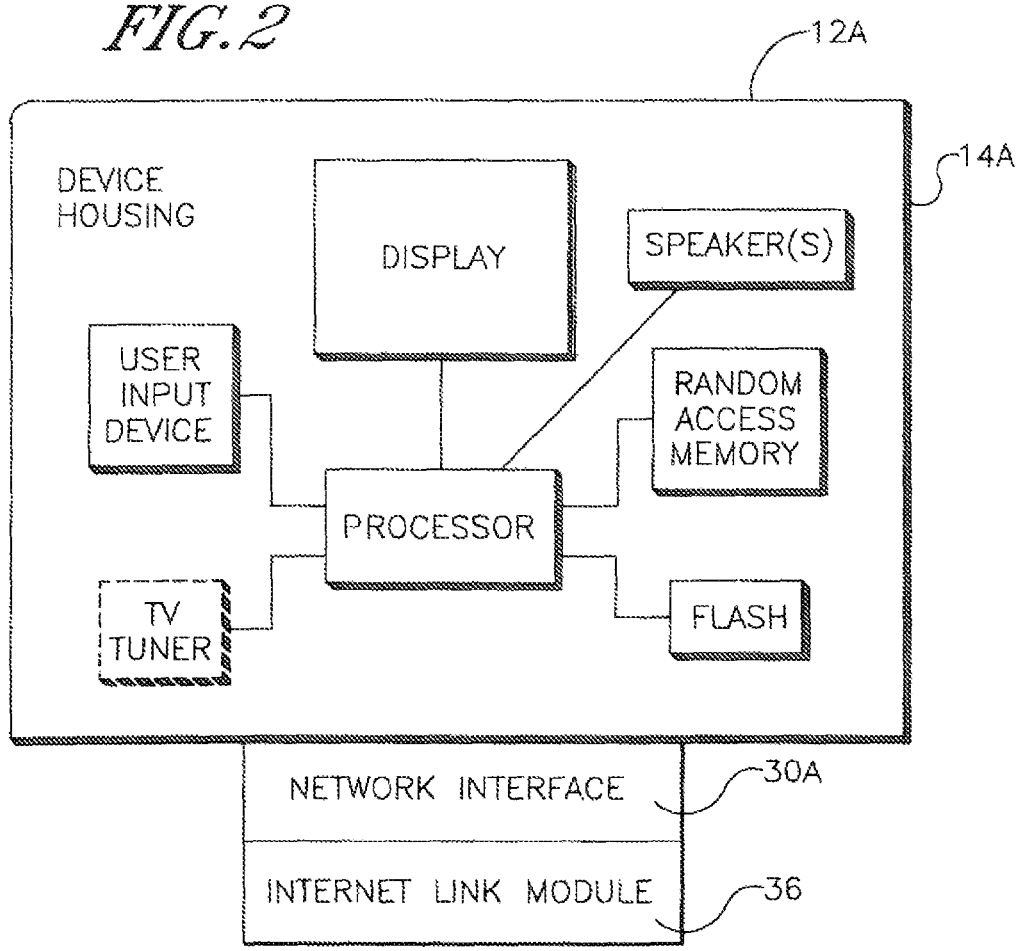
FIG. 2 is a block diagram of another example system in accordance with present principles.

FIG. 2 shows a CE device 12a that in all essential respects is identical to the device 12 shown in FIG. 1, except that a network interface 30a is not located within the device housing 14a but instead is supported in a separate Internet link module housing 36 that may be mounted on the device housing 14a.

Figure 3:
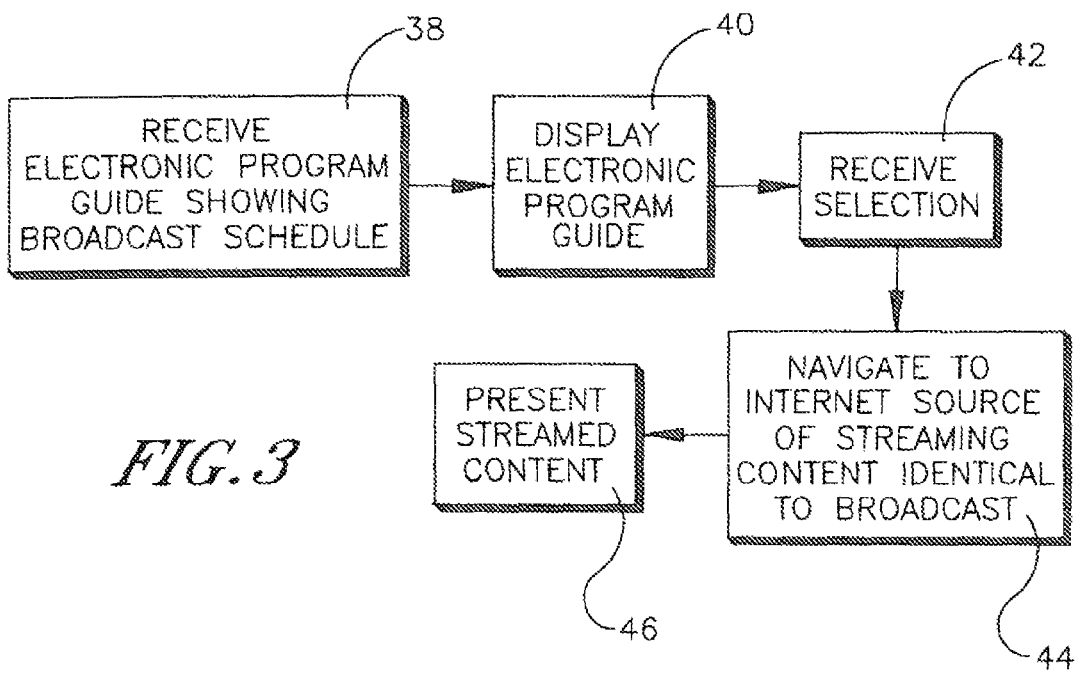
FIG. 3 is a flow chart of example logic.

Now referring to FIG. 3, example logic in accordance with present principles may be seen. Commencing at block 38, the TV receives an electronic program guide (EPG) such as the EPG shown in FIG. 4 and described below which presents a schedule of broadcast TV programming. The EPG may be received from the TV source 29 or one of the Internet servers 32, 34. Indeed, separate EPGs may be received from both the TV source 29 and Internet and consolidated by eliminating duplicate entries and inserting, in order, channel numbers received from the Internet-sourced EPG into the EPG received from the TV source 29.

Proceeding to block 40, the EPG is presented on the display 18, typically in response to a viewer toggling a "guide" key on an input device 26 such as a TV RC. Using the input device 26 a viewer can navigate around the EPG and select an entry, which is received at block 42 by the processor 16. Selection of an entry along with a command to tune to the associated channel (which may be implied in the single click selection of a channel) causes the processor to navigate to an Internet source of the audio-video program associated with the selected channel at block 44. Content that is identical to that broadcast on the selected channel from the TV source 29 is streamed from the appropriate Internet server 32/34 and presented on the display 18 at block 46.

In understanding how the processor 16 undertakes the navigation at block 44, it is to be understood that the below-described EPG may contain hidden hyperlinks tied to the presented channels on the EPG. The hyperlinks can be used by a browser executed by the processor 16 to access the appropriate Internet source of streamed content which is identical to the content presented on the EPG as being available from a broadcast channel from the TV source 29. Or, the EPG may not contain hyperlinks underlying listed programming. Instead, upon receipt of a program selection, the processor 16 may execute a browser to send the selection to, e.g., the management server 32, which looks up the Internet address at which the desired content may be accessed and sends the address back to the processor 16 in near real-time. The processor 16 then executes the browser to access streamed content corresponding to the selected broadcast program from the appropriate Internet server site.

Figure 4:
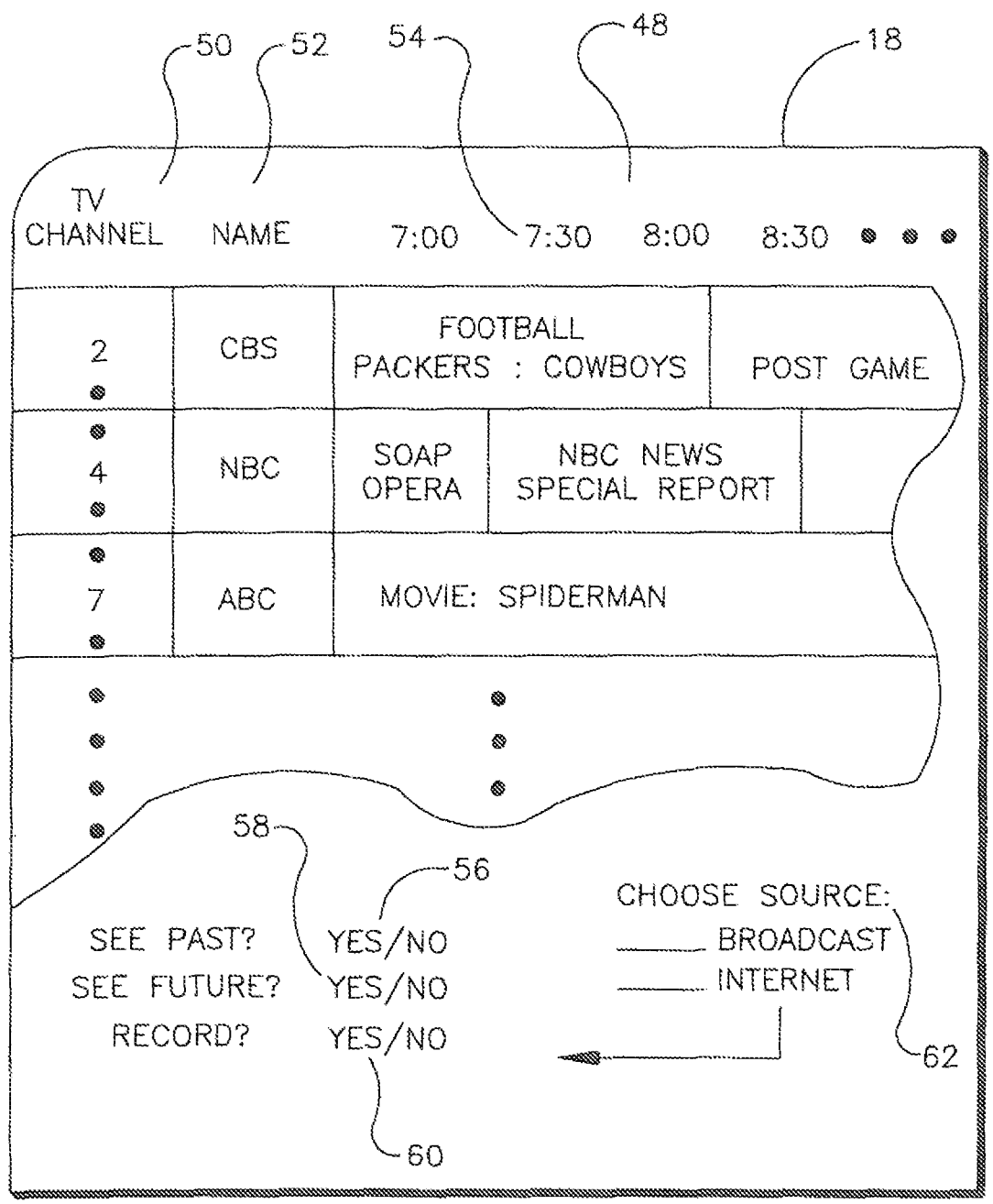
FIG. 4 is a screen shot of an example EPG.

Now referring to FIG. 4 and with the logic of FIG. 3 in mind, an EPG 48 may be presented on the display 18. A left column 50 presents an ordered list of TV broadcast channel numbers as shown. A second-left column 52 may present the associated network names or station names associated with the channel numbers in the left-most column 50. To the right of the second-left column 52 may be a program schedule matrix 54 listing, by sequential time slots as shown, the names of broadcast programs from the TV source 29.

As described above, hyperlinks can underlie the various entries on the EPG 48. Or, selection of an entry on the EPG can cause the TV to query an Internet server for an associated hyperlink which is returned to the TV to enable the processor 16 to navigate to the corresponding Internet source of content. In either case, as also described above, when a viewer selects a broadcast TV channel, the associated hyperlink is used to navigate to the Internet source providing the program and the Internet-sourced program is displayed instead of the program as it is received from the TV broadcast source 29. That is, although the EPG 48 lists broadcast TV programs, when a program is selected from the EPG the selected program indeed is shown but not from the TV source 29, but rather from an Internet source of the identical content.

Owing to the above principles, greater flexibility is provided to the viewer and example manifestations of this are depicted in FIG. 4. For example, a "past" selector element 56 may be provided on the EPG 48 that is selectable to navigate to an Internet server streaming episodes of a selected program that have been broadcast in the past. Similarly, a "future" selector element 58 may be provided on the EPG 48 that is selectable to navigate to an Internet server streaming episodes of a selected program that will be broadcast in a time slot in the future to the time slot shown. A "record" selector element 60 can be presented and selected by a viewer to record the selected program. Thus, hyperlinks such as uniform resource locator (URL) links for past, current and future programs can be embedded in the EPG 48. The EPG 48 may also provide for additional features such as video on demand or pay-per-view functionalities through the IPTV EPG concept with internet connection to the IPTV services.

Additionally, a viewer may be given the option of selecting the source—the TV source 29 or an Internet server 32/34—from which to access a desired program. To this end, a source selector element 62 may be provided that enables a viewer to select "broadcast", in which case a selected program from the TV tuner 28 is presented on the TV, or "Internet", in which case the same program is presented but as received not from the TV source 29 through the tuner 28 but rather from an IPTV server 32/34 as described above.

It may also be appreciated that although the EPG 48 presents broadcast TV programming, the device 12 need not include the TV tuner 28 with its inherent regional limitation of needing to bond to the dedicated broadcast services. Instead, present principles provide a convenient way for an IPTV user to locate the device 12 in any geographic location without the limitation of broadcast provider as long it has the interne connection, providing a location free IPTV service by means of an easily recognizable and user-firendly EPG 48 apparently listing broadcast TV programming.

While the particular IPTV EPG LINKING BROADCAST CHANNELS TO INTERNET SOURCES OF SCHEDULED PROGRAMMING is herein shown and described in detail, it is to be understood that the subject matter which is encompassed by the present invention is limited only by the claims.

What is claimed is:

1. Method comprising:
presenting on a display device a user interface (UI) listing plural broadcast TV programs available from a TV signal source;
receiving at the display device a selection of a TV program on the UI;
responsive to receiving the selection of a TV program on the UI, automatically obtaining an Internet link to a server sourcing the TV program; and
receiving the TV program from the server for presentation thereof in lieu of receiving the TV program from the TV signal source, wherein the UI lists plural television channel numbers each carrying televised programming and is presented on the display device in response to a viewer toggling a "guide" key on remote control (RC), wherein using the RC a viewer can navigate around the UI and select a TV channel to navigate to an Internet source of an audio-video program associated with the selected TV channel such that content that is identical to that broadcast on the selected TV channel from the TV signal source is streamed from an Internet server and presented on the display device, wherein Internet-sourced content is displayed instead of the TV program as it is received from the TV signal source, such that although the UI lists broadcast TV programs, when a program is selected from the UI the selected program indeed is shown but not from the TV signal source, but rather from an Internet source of identical content.

2. The method of claim 1, wherein the UI is an electronic program guide (EPG).

3. The method of claim 2, wherein the EPG includes a first column presenting an ordered list of TV broadcast channel numbers and a second column presenting network names and/or station names associated with respective channel numbers in the first column.

4. The method of claim 3 wherein the EPG includes a program schedule matrix listing, by sequential time slots, names of broadcast programs from the TV signal source.

5. The method of claim 1, wherein the display device includes a tuner configured to receive signals from the TV signal source.

6. The method of Claim wherein the display device includes no tuner configured to receive signals from the TV signal source.

7. The method of claim 2, wherein the EPG includes, for at least some broadcast TV programs available from the TV signal source, associated by hyperlinks point to Internet sources of the respective programs.

8. The method of claim 2, wherein responsive to selection of broadcast TV programs on the EPG, the method includes sending a request for an associated hyperlink to an Internet server.

9. Consumer electronic (CE) device comprising;
display;
network interface;
processor configured with instructions for controlling the display and communicating with the Internet through the network interface;
the processor configured for executing logic including:
presenting on the display an electronic program guide (EPG) listing broadcast TV programming;
receiving selection of a program entry on the EPG corresponding to a TV program;
responsive to selection of the entry corresponding to the TV program, automatically accessing an Internet source of the TV program instead of a broadcast TV source also presenting the TV program simultaneously with the Internet source; and
presenting on the display the TV program received from the Internet source, wherein the EPG lists plural television channel numbers each carrying televised programming and is presented on the display in response to a viewer toggling a "guide" key on remote control (RC), wherein using the RC a viewer can navigate around the EPG and select a TV channel to navigate to an Internet source of an audio-video program associated with the selected TV channel such that content that is identical to that broadcast on the selected TV channel from a TV signal source is streamed from an Internet server and presented on the display.

10. The CE device of claim 9, wherein the device includes a TV tuner through which the TV program may be obtained from a broadcast TV source different from the Internet source.

11. The CE device of claim 9, wherein the device includes no TV tuner through which the TV program may be obtained from a broadcast TV source different from the Internet source.

12. The CE device of claim 9, wherein the EPG includes:
first column presenting an ordered list of TV broadcast channel numbers and a second column presenting network names and/or station names associated with respective channel numbers in the first column.

13. The CE device of claim 12, wherein the EPG includes a program schedule matrix listing, by sequential time slots, names of broadcast programs from a broadcast TV source.

14. The CE device of claim 9, wherein the EPG includes:
a "past" selector element selectable to navigate to an Internet server streaming episodes of a selected program that have been broadcast in the past.

15. The CE device of Claim 9, wherein the EPG includes:
a "future" selector element selectable to navigate to an Internet server streaming episodes of a selected program scheduled to be broadcast in a time slot future to a time slot shown on the EPG.

16. The CE device of claim 9, wherein the EPG includes:
a source selector element selectable to cause the processor to access a TV program from the TV tuner for presentation on the display and also selectable to cause the processor to access the TV program from an Internet server for the same time slot.

17. Display device controlled by a processor to;
present a visual electronic program guide (EPG) including:
a first column presenting an ordered list of TV broadcast channel numbers and a second column presenting network names and/or station names associated with respective channel numbers in the first column;

a program schedule matrix listing, by sequential time slots, names of broadcast programs from a broadcast TV source and source selector element including a broadcast selector selectable to cause, responsive to a user selecting a first TV program from the EPG, the processor to access the first TV program from a TV tuner for presentation on the display, the source selector element also including an Internet selector selectable to cause, responsive to a user selecting the first TV program from the EPG, the processor to access the first TV program from an Internet server for the same time slot, wherein source selector element enables a viewer to select "broadcast", in which case a selected program from a TV tuner is presented on the display device, or "Internet", in which case the selected program is presented but as received not from the broadcast TV source through the TV tuner but rather from an Internet server;

at least a "past" selector element selectable to navigate to an Internet server streaming episodes of a selected program that have been broadcast in the past and/or a "future" selector element selectable to navigate to an Internet server streaming episodes of a selected program that will be broadcast in a time slot the future to a time slot shown, and/or a "record" selector element being presented and selectable by a viewer to record a selected program.

18. The device of claim 17 wherein the EPG includes:

a "past" selector element selectable to navigate to an Internet server streaming episodes of a selected program that have been broadcast in the past.

19. The device of Claim 18, wherein the EPG includes:

a "future" selector element selectable to navigate to an Internet server streaming episodes of a selected program scheduled to be broadcast in a time slot future to a time slot shown on the EPG.

* * * * *